United States Patent [19]
Teller

[11] Patent Number: 6,143,553
[45] Date of Patent: Nov. 7, 2000

[54] PROCESS AND MATERIALS FOR REMOVING POLLUTANTS

[75] Inventor: Aaron J. Teller, Palm Beach Gardens, Fla.

[73] Assignee: Regenerative Environmental Equipment Co., Inc., Branchburg, N.J.

[21] Appl. No.: 09/080,297

[22] Filed: May 18, 1998

[51] Int. Cl.[7] ........................................... C12S 5/00
[52] U.S. Cl. ..................... 435/266; 435/299.1; 435/176; 435/177
[58] Field of Search ................................. 435/262, 262.5, 435/266, 176, 177, 289.1, 299.1; 422/122

[56] References Cited

U.S. PATENT DOCUMENTS

| | | |
|---|---|---|
| 1,701,825 | 2/1929 | Seil . |
| 2,200,581 | 5/1940 | Pruss et al. . |
| 3,216,905 | 11/1965 | Baptist . |
| 3,324,630 | 6/1967 | Teller et al. . |
| 3,828,525 | 8/1974 | Copa et al. . |
| 4,073,686 | 2/1978 | Adams . |
| 4,544,381 | 10/1985 | Schmidt . |
| 4,662,900 | 5/1987 | Ottengraf . |
| 4,781,732 | 11/1988 | Wondrasch et al. . |
| 4,818,505 | 4/1989 | Muller . |
| 4,871,673 | 10/1989 | Rehm et al. . |
| 4,983,299 | 1/1991 | Lupton et al. . |
| 4,999,302 | 3/1991 | Kahler et al. . |
| 5,077,025 | 12/1991 | Glass . |
| 5,279,963 | 1/1994 | Hobby . |
| 5,409,834 | 4/1995 | Birdwell . |

FOREIGN PATENT DOCUMENTS

| | | | |
|---|---|---|---|
| 0 186 925 | 7/1986 | European Pat. Off. . | |
| 0 357 960 | 3/1990 | European Pat. Off. . | |
| 20 20 207 | 11/1971 | Germany | 435/266 |
| 22 37 929 | 2/1974 | Germany . | |
| 32 37 375 | 3/1984 | Germany . | |
| 3705 837 | 6/1988 | Germany . | |
| 195 09 368 | 9/1996 | Germany . | |
| 195 15 075 | 10/1996 | Germany . | |
| 52-58068 | 5/1977 | Japan | 435/266 |
| 52-63859 | 5/1977 | Japan | 435/266 |
| 62-298363 | 12/1987 | Japan | 435/266 |
| 62-298364 | 12/1987 | Japan . | |
| 9729832 | 8/1997 | WIPO . | |

OTHER PUBLICATIONS

Ehrhardt et al. 'Phenol degradation by microorganisms absorbed on activated carbon.' Applied Microbiology and Biotechnology. vol. 21 (1985), pp. 32–36.

Heist, et al., *Control Of Odor Emissions From Wastewater Treatment Plants In A Bioscrubber*, Oct. 1995, (Preprint).

*Primary Examiner*—William H. Beisner
*Attorney, Agent, or Firm*—Howrey, Simon, Arnold & White, LLP; Michael J. Bell

[57] ABSTRACT

A process for removing pollutants is enhanced by using a slurry containing a particulate adsorbent carrying a biologically active material. The pollutant is contacted with the slurry and is adsorbed and biodegraded therein. The slurry is useful in a bioscrubber and provides economical high flow rate treatment of gases.

20 Claims, 1 Drawing Sheet

PROCESS AND MATERIALS FOR REMOVING POLLUTANTS

BACKGROUND OF THE INVENTION

1. Field of the Invention

The invention relates in general to the removal of pollutants via biodegradation and is particularly useful in a bioscrubber application.

2. Description of Related Art

The use of biologically active materials to biodegrade pollutants has been pursued for a long time. U.S. Pat. No. 1,701,825 teaches a process for removal of "obnoxious constituents such as sulphur compounds" from a gas. The process comprises contacting a gas with a liquid medium containing bacteria. The sulfur compound is adsorbed from the gas into the liquid medium where it is oxidized by the bacteria. Preferably the gas and liquid medium are intimately mixed in a column or large shallow bed, each containing an appropriate contact material. This type of process has become known as a bioscrubber. Unfortunately, the bioscrubber systems known thus far have been too inefficient, resulting in unsatisfactory performance. At significant flow rates, multiple reactors and/or traditional chemical absorbers are frequently required. Also, large holdup reactors are frequently required in order to carry out or complete the biodegradation reaction before the liquid medium can be recycled to the gas contact zone.

For example, U.S. Pat. No. 4,544,381 (which is incorporated herein in its entirety by reference) relates to a process for removing pollutants from gas by biological means. The gas is contacted with an aqueous suspension of microorganisms for 0.5 to 5 seconds. The suspension is then retained for 3 to 10 minutes before being recycled back to the gas contact zone. Simultaneously, active biomass suspension is constantly being provided to the suspension between the contact phase and the retention phase and excess suspension is being removed.

However, the efficiency of the removal is poor. The patent states (see col. 2, lines 39–42) that "only sparingly degradable substances, such as aliphatic and aromatic chlorinated hydrocarbons, can be removed from emission gases by up to one third." To combat this shortcoming, multiple scrubber systems in series are proposed in order to improve the efficiency to around 50%. Additionally, the patent suggests post-treating the gas with a conventional trickle filter to further remove the pollutants. This embodiment is also shown in the drawings and examples. The necessity of using a filter restricts the gas flow rate in the entire system, in view of the pressure drop across the filter.

Indeed, the data in the examples show that this invention operates at low gas flow rates (about 7 to 1.8 ft$^3$/min. or "cfm" which, at least in the 300 mm diameter trickle filter column, translates to about 0.15 to 0.04 ft/s) and that decreasing the flow rate increases efficiency in pollutant removal. Thus, reasonable gas flow rates of the magnitude generated in commercial and industrial plants, e.g. 10,000 to 50,000 cfm or more, are not practical in this invention.

U.S. Pat. No. 5,077,025 (which is incorporated herein in its entirety by reference) relates to a process for scrubbing waste gases with an adsorbent suspension and removing the adsorbed pollutant from the suspension by biodegradation in a subsequent reactor. Specifically, the waste gas is contacted with the adsorbent suspension in an ordered mass-transfer zone to remove the pollutants from the gas. The pollutant-containing liquid is then brought to a bioreactor and contacted with bacteria for one to four hours in order to biodegrade the pollutants. Optionally, bacteria can additionally be present in the adsorbent suspension, but the patent teaches that such does not aid in removal of pollutants from the gas stream or in significantly reducing the bioreactor residence time needed.

The long bioreactor residence time (1–4 hrs.) required by this technique before the adsorbent can be reused is not convenient or desired. Additionally, the drawings indicate that countercurrent flow is contemplated in the gas contact area. But such an operation would not be practical, as plugging would occur within a matter of hours.

U.S. Pat. No. 5,279,963 (which is incorporated herein in its entirety by reference) relates to a system for decontaminating gas using a series of absorption columns and a bioreactor. The contaminant-containing gas is bubbled up through a liquid, generally water, in a packed absorption column to transfer the contaminant to the liquid. The gas and liquid are then separated and the liquid is pumped into a bioreactor comprising a packed bed and microorganisms for biodegradation of the contaminants followed by recycling of the liquid to the adsorption columns. The microorganisms may also be present in the liquid used in the absorption columns.

This system requires multiple columns and is thus inefficient. Moreover, the bubbling of the gas through the liquid restrains the gas flow rates and thus prevents the practical application of this system in commercial or industrial settings.

Another technique is described in "Control of Odor Emissions From Wastewater Treatment Plants" by Heist et al. of Kruger Inc., Denmark, published October 1995. Here a countercurrent bioscrubber packed system similar to the first stage described in U.S. Pat. No. 4,544,381 is used. The pH is controlled by the addition of certain reagents in order to improve the solubility of the target pollutant, hydrogen sulfide. However, because of the inadequacy of the bioscrub unit, a secondary carbon absorber is used. Further, inasmuch as a slurry of biologically active material is used, the scrubber becomes unstable when liquid rates approach the desired levels for commercial applications.

As indicated by the above discussion, bioscrubbers have heretofore been inadequate. The flow rates needed for real world applications have not generally been attainable unless columns and reactors of excessive size are considered. Further, the bioscrubbers have generally not been sufficiently efficient to operate alone and instead must be combined with other units. A bioscrubber that can accommodate large gas flow rates and that can provide good removal efficiencies is greatly desired by the art.

SUMMARY OF THE INVENTION

It is an object of the present invention to provide a method for removing pollutants using biodegradation.

It is another object of the invention to provide a slurry useful in biodegrading pollutants.

A further object of the invention is to provide a bioscrubber unit for removing pollutants from a gas stream.

One or more of the above objects, as well as other objects of the invention, can be obtained by preferred embodiments of the present invention, the general method of which comprises contacting a gas containing a pollutant with a slurry containing a particulate adsorbent carrying a biologically active material thereon, to thereby reduce the amount of said pollutant by biodegradation. The invention also relates to a process which comprises (1) adsorbing a pollutant onto a particulate adsorbent carrying a biologically active material to thereby concentrate the pollutant in close proximity to said biologically active material; and (2) biodegrading said adsorbed pollutant by said biologically active material.

Another embodiment of the invention is a scrubber comprising a filamentous packed bed having a free volume of at least 70%; a slurry in the packed bed which contains a particulate adsorbent carrying a biologically active material thereon; a gas in the packed bed; and a pollutant in the packed bed that is adsorbable by the particulate support and that is biodegradable by the biologically active material. The present invention also relates to a slurry comprising a liquid medium having dispersed therein a particulate adsorbent, wherein at least 50% of all of the particulate adsorbent supports a biologically active material.

The present invention is based in part on the discovery that supporting biologically active material for biodegrading a pollutant on an adsorbent particulate greatly increases the efficiency of the biodegradation reaction. This is surprising since the average artisan had come to believe, based on decades of poor performance, that the biodegradation reaction was simply too slow to ever be competitive with conventional chemical scrubbers. But, by supporting the biologically active material on a particulate adsorbent, the pollutant is concentrated in close proximity to the biologically active material and the kinetics of removal can be significantly increased over conventional bioscrubber systems by a factor of 2 to 100 or more and without the need for a secondary reactor or adsorber. Moreover, it turns out that the conventional wisdom was wrong in that the biodegradation reaction time is not too slow. Accordingly, the present invention allows for the first time the formation of a bioscrubber that has equal or greater efficiencies than conventional chemical scrubbers and yet provides all of the economic and environmental advantages long promised by the bioscrubber technology.

DETAILED DESCRIPTION OF THE INVENTION

Figure 1:
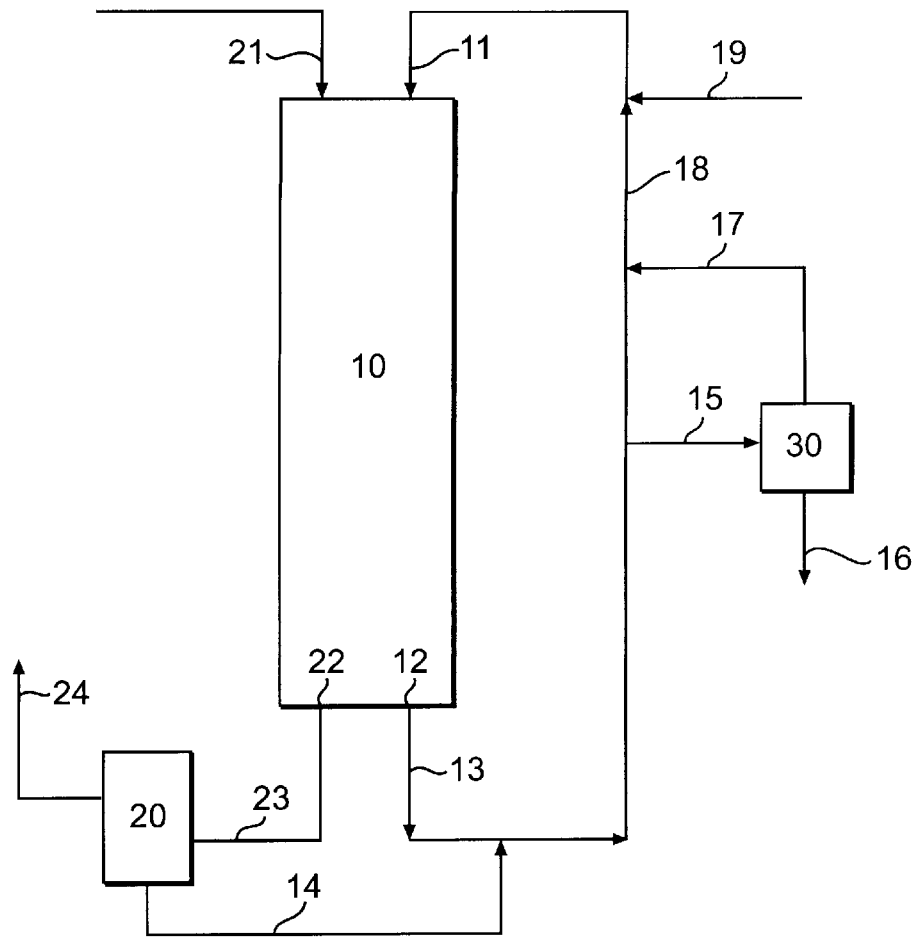
FIG. 1 is a schematic diagram of a bioscrubber apparatus according to the principles of the invention.

The present invention relates to the use of a slurry to adsorb and biodegrade pollutants. The slurry comprises a liquid medium having a particulate adsorbent suspended or dispersed therein. Further, a biologically active material is supported or carried on the particulate adsorbent.

A "pollutant" for purposes of this application is any compound that is susceptible to biodegradation and that is considered undesirable such that removal thereof is sought. The pollutant can be organic or inorganic. Generally the pollutant to be removed is within the class of hydrocarbons, oxygenated hydrocarbons, halogenated hydrocarbons, halogenated-oxygenated hydrocarbons, nitrogen compounds, or sulfur compounds. For example, pollutants can be aliphatics, aromatics, alcohols, aldehydes, ketones, esters, mercaptans, nitrogen oxides, sulfur oxides, and sulfides. Pollutants include volatile organic compounds (VOC's) as well as noxious compounds. Typical examples of pollutants include hydrogen sulfide, dimethyl sulfide, ethyl chloride, ammonia, phenol, toluene, 2-chlorophenol, etc.

As used herein, the term "particulate adsorbent" means any finely divided material (250 microns or less) capable of adsorbing a substance. Generally the particulate adsorbent is selected so as to provide good adsorption of the targeted pollutant or pollutants, although such is not necessarily required. The finely divided material normally has an average particle size of from about 5 to about 150 microns, preferably from about 10 to about 100 microns, and more preferably from about 15 to about 60 microns. Typically the adsorbent material has surface pores or voids which increase the surface area and facilitate adsorption of a substance to the material. In one embodiment the particulate adsorbent has a surface area of at least about 10 $m^2/g$, preferably at least about 100 $m^2/g$, and more preferably at least about 500 $m^2/g$. Commercially available activated carbon generally has a surface area of 700–1000 $m^2/g$. Suitable materials for the particulate adsorbent are well known in the scrubber art and include activated carbon, char, diatomaceous earth, alumina, aluminosilicates, and flyash, although the invention is not limited to these materials. Other insoluble materials can be used provided that they exhibit a sufficient surface area and pore size to be useful adsorbents. A preferred particulate adsorbent is an activated carbon.

While the particulate adsorbent is referred to in the singular (i.e. "adsorbent" and not "adsorbents"), such is done only for convenience and it should be understood that the "particulate adsorbent" is comprised of a plurality of adsorbent particles. To this end, the phrase "particulate adsorbent carrying a biologically active material" means that at least a portion of the particles carry a biologically active material. It does not require that every particle comprising the particulate adsorbent supports a biologically active material. Typically, at least 50%, preferably at least 75%, and more preferably substantially all (about 97–100%) of the particles of the particulate adsorbent support a biologically active material.

A "biologically active material" as used herein includes microorganisms, derivatives thereof, and enzymes that are capable of biodegrading a pollutant or pollutants. Typically the biologically active material is a microorganism such as a bacteria, an algae, or a fungus. The biologically active material can be aerobic or anaerobic depending upon the pollutant and the composition of the gas stream. In general, biologically active materials suitable for a particular pollutant and/or gas stream are well known in the art. For example, T. dinitrificans and arthobacter can biodegrade oxygenated nitrogen compounds into nitrogen; the Thiobacillus series, beggiota, thiospora and thiospirillium can biodegrade sulfur compounds to form a reduction product including converting hydrogen sulfide to sulfur; Micrococcus and the Bacillus group can biodegrade hydrocarbons; desulfovibrin, desufuricans, and *Chlorobium irmicola* forma can biodegrade sulfur dioxide into its reduction product; *Chlorobium thiosulfatophilum* and *Methanobacterium thermoautotrophicum* can assimilate carbon dioxide. These and other well known biologically active materials, such as those mentioned in the U.S. Patents that have been incorporated herein by reference, can be used in the present invention. Additionally, biologically active material that has been trained or acclimated to the pollutants and/or genetically engineered to have enhanced pollutant metabolism are also suitable for use and included in the present invention.

In one embodiment of the invention, two or more species of biologically active material are carried on the particulate adsorbent in order to enhance pollutant removal and/or destroy two or more pollutants. For example, a particulate adsorbent could support two species of bacteria; one for biodegrading phenol-type compounds and one for biodegrading sulfur oxides. Of course, a single species of biologically active material can be effective against two or more pollutants. In either case, a plurality of pollutants can be effectively removed by a single slurry.

The biologically active material can be coated or deposited onto the particulate adsorbent by methods generally known for depositing such materials onto a solid support. In particular, methods analogous to those set forth in U.S. Pat. No. 4,871,673 (incorporated herein by reference in its entirety) for deposition onto granular carbon and the references cited therein can be used. The method generally comprises contacting the particulate adsorbent, either in dry or slurry form, with an aqueous suspension of the biologically active material. The contacting is normally effected with stirring or movement of one or both of the particulates and the biologically active material(s) and/or holding the contacted mixture for a sufficient duration. For example, a suspension of biologically active material is added to an adsorbent particulate slurry followed by some initial shaking or stirring and then waiting from 1 to 10 hours. The suspension of biologically active material is generally cloudy, but as the biologically active material is deposited it becomes clearer. Thus, the extent deposition of the biological active material can frequently be determined optically by appropriate apparatuses and/or with the naked eye. Surface modifiers to enhance the attraction or binding of the biologically active materials to the particulate material can be used but are not normally necessary given the adsorbent nature of the particulate material used herein.

Typically the particulate adsorbent is initially coated with an average of 0.5 to 5 biologically active materials per particle. This means 0.5 to 5 microorganisms or derivatives thereof per particle or the equivalent amount of enzyme that would be found in 0.5 to 5 microorganisms per particle. Preferably an average of 1 to 3 biologically active materials per particle of the particulate adsorbent is deposited in making the initial particulate adsorbent containing biologically active material. It should be noted that such is the initial concentration of biologically active material on the particulate adsorbent and does not necessarily correspond to the concentration present after the slurry is placed in use due to cell growth/death, etc.

The particulate adsorbent carrying a biologically active material is dispersed in a liquid medium to form a slurry. The amount of particulate adsorbent can be determined based on the mass of pollutant to be recovered, the gas and slurry flow rates, the initial concentration of the biologically active material on the adsorbent support, and the physical and chemical characteristics of the pollutant to be removed. Generally the concentration of adsorbent particulate is from about 0.5 to 15 wt. %, preferably 0.5 to 10 wt. %, more preferably 1.5 to 9 wt. %, based on the total weight of the slurry. The liquid medium is normally aqueous and can contain nutrients or other additives for sustaining or enhancing the biologically active material and/or its metabolism of the pollutant, as is well known in the art. Also, the biodegradation product as well as unsupported biomass may be present in the slurry. The pH of the aqueous medium is not particularly limited and is generally set by the equilibrium conditions of the adsorption-biodegradation reactions and is typically from 5 to 12, depending on the biologically active material employed and the pollutant being removed. Generally the pH is from about 6 to about 8.

The slurry containing a particulate adsorbent carrying a biologically active material is contacted with a gas stream containing a pollutant. The pollutant is transferred from the stream to the slurry during the contact and subsequently biodegraded by the biologically active material. The manner in which the slurry and gas are brought into contact is not particularly limited and includes spraying the slurry with, or into, the gas stream, bubbling or otherwise passing the gas through the slurry, and passing the slurry and gas through a column of trays, plates, or packing. Generally the particulate adsorbents, due to surface tension effects, tend to concentrate on or near the surface of the liquid medium and thus may adsorb the pollutant directly from the gas onto the solid particulates during the contacting step. In this way, water soluble as well as water insoluble pollutants can be removed from the gas stream; the latter without the need to carefully control the pH of the liquid medium. Indeed, conventional water based scrubbers have difficulty removing water insoluble pollutants and thus typically contain chemical additives to increase the pollutant solubility therein. Such additives are generally not needed in the present invention. By adsorbing the pollutant to the particulate adsorbent, the pollutant concentration around the supported biologically active material becomes high and the kinetics of assimilation and biodegradation are increased, thereby reducing the time needed to destroy (biodegrade) the pollutant.

The biodegradation reaction in the context of the present invention does not require reducing the pollutant to its elements or to classical respiration products such as water or carbon dioxide, although such is embraced. Rather, only a conversion of the pollutant, preferably to a harmless product, by a biological or metabolic pathway or portion thereof is contemplated. For example, the biodegradation reaction may involve only a reduction of the pollutant by the biologically active material. The biodegradation product is typically removed from the slurry along with excess biomass by conventional techniques. However, such removal is normally not required before the slurry can be reused. That is, so long as the pollutant has been biodegraded, the slurry is generally ready to be reused. Accordingly, the biodegradation product and/or excess biomass can be removed in a batchwise manner or by continuous treatment of all or a portion of the slurry, etc. Preferably the slurry is recycled as part of a continuous process for removing pollutants from a gas stream; the biodegradation of the pollutant being substantially complete before the slurry is reintroduced into the contact zone. More preferably, no bioreactor holding tank zone for completing biodegradation is present in the recycle path of the slurry and a portion of the slurry follows a recycle path through a device for removing biodegradation product and/or excess biomass therefrom before being rejoined with the remainder of the recycled slurry.

For increased efficiency, the contacting is carried out under conditions that provide high surface renewal rates. This means that fresh or regenerated particulate adsorbent carrying biologically active material is being continually brought to the surface for contact with the gas. To achieve this, the contacting is preferably carried out in a packed bed. The packing can be any known type and preferably has a high free volume such as at least about 70%, more preferably at least 80%. In this regard, filamentous packing material, such as described in U.S. Pat. No. 3,324,630 (which is incorporated herein in its entirety by reference), is preferred because of its high free volume. Additionally, filamentous packing materials enhance the surface renewal rate by providing a greater number of interstitial sites and are thus more advantageous than traditional solid-walled rings or saddles. The interstitial sites, which are formed at points of contact between packing materials, generally make a "V" shape that splits the liquid stream, thereby bringing the central portion of the stream to the newly formed stream surfaces. By establishing good surface renewal rates, renewed particulate adsorbents (those having already gone through the adsorption-biological assimilation-biodegradation process) return from the body of the slurry to the surface created by surface renewal to again initiate the adsorption-biological assimilation-biodegradation sequence.

The slurry and the polluted gas stream are both preferably passed simultaneously through the packed bed in order to effect contacting therebetween. The flows may be countercurrent, co-current or cross-flow (i.e. proceeding substantially perpendicular to one another). Preferably, the flows are not countercurrent. In this way high pressure drops across the bed and the risk of forming solid deposits and plugging are reduced or avoided.

The invention will be further described with reference to the drawings. An embodiment of the present invention is illustrated in each of the drawings, wherein like reference numerals describe like elements. Specifically, FIG. 1 shows a packed bed scrubber column 10 at the top of which is supplied a pollutant-containing gas stream 21 and a slurry stream 11 containing particulate adsorbents carrying a biologically active material. The gas and slurry flow down co-currently over the packing material in the bed, which is preferably a filamentous packing, and are thoroughly contacted with one another. The pollutant is thereby removed from the gas stream. The gas exits the packed bed at outlet 22 as scrubbed gas stream 23. The slurry exits the packed bed at outlet 12 as recycle slurry stream 13. The slurry stream 13 is then directed back to the top of the packed bed where it becomes slurry stream 11 again. On the recycle path, additional nutrient(s), biologically active material, water, etc. can be added via stream 19 to the slurry as needed. The scrubbed gas stream 23 is directed to a demister 20 where any slurry liquor is removed 14 and returned by combining it with recycle slurry 13. Alternatively, the slurry liquor recovered from the demister can simply be discarded. The demisted gas 24 is released from the system and typically released into the atmosphere as clean gas.

The mass flow rate of the slurry stream 11 is generally at least about 250 lbs/(hr·ft$^2$), preferably at least 1,000 lbs/(hr·ft$^2$), and more preferably at least 5,000 lbs/(hr·ft$^2$). Typically, the slurry mass flow rate is within the range of from 1,000 to 17,000 lbs/(hr·ft$^2$), more preferably 5,000 to 15,000 lbs/(hr·ft$^2$). The mass flow rate value is determined for purposes of this application at or near the entrance to the packed bed. Such a measurement site is not critical, but rather avoids any ambiguity caused by variations in the slurry mass as it passes through the packed bed due to the adsorption of the pollutant, possible loss of water into the gas stream, etc.

The mass flow rate of the gas is generally at least about 100 lbs/(hr·ft2), preferably at least 250 lbs/(hr·ft$^2$), more preferably at least 500 lbs/(hr·ft$^2$) and is typically in the range of from about 250 to about 2500 lbs/(hr·ft$^2$), more preferably about 500 to about 1500 lbs/(hr·ft$^2$). The gas stream to be scrubbed is typically air-based such as the flue gas from an incinerator or the effluent from a pulp or paper mill, etc, although such is not required. These kinds of gas streams usually have a density of 0.04 to 0.08 lbs/ft$^3$, depending upon the humidity. The mass flow rate values of the gas stream are also measured, for purposes of this invention, at or near the entrance to the packed bed in order to be consistent and unambiguous. The ratio of the slurry mass flow rate to the gas mass flow rate is preferably within the range of from 2:1 to 20:1. The mean residence time in the packed bed is normally not more than 60 seconds, and is typically from 1 to 20 seconds depending on the specific reaction kinetics, the degree of removal and destruction, etc., although longer times can be used.

As the gas and slurry travel through the packed bed the pollutant is adsorbed onto the particulate adsorbent which facilitates assimilation and biodegradation by the biologically active material. By the time the slurry is reintroduced into the packed bed the pollutant contained therein has been substantially completely biodegraded, and preferably by essentially the time that the slurry leaves the packed bed the pollutant has been biodegraded. Thus, in this embodiment of the invention, a separate bioreactor or holding tank for biodegradation of the pollutant is not needed. Both adsorption and most or all of the biodegradation occur within the packed bed. This is true at most all removal rates (adsorption rates) of the pollutant from the gas including from around 60% to about 99% or more. It is believed that the high efficiency in removing and destroying the pollutant achieved in this embodiment is due to the concentrating of the pollutant in close proximity to the biologically active material on the particulate adsorbent and the high surface renewal rates caused by the high flow rates over the packing material.

Over time the biomass and/or the biodegradation product(s) may increase in the slurry. An increase in biomass may lead to increase in the pressure drop across the packed bed, thereby increasing operating costs. A slipstream 15 diverts a portion of the slurry to a biomass-biodegradation product separator 30 where excess biomass and/or the biodegradation product(s) are removed from the slurry. The cleaned slipstream 17 is returned to the recycle slurry 13 to make slurry stream 18. The removed biomass and/or biodegradation product 16 are exhausted from the system. In some embodiments, the biodegradation product is itself a useful or valuable material that can be collected and sold. For example, the biodegradation of hydrogen sulfide produces sulfur which can be recovered and sold. In others, the biodegradation product can be retained internally to the biologically active material or it can be released with the cleaned gas stream.

The pressure drop in this embodiment is generally in the range of 0.05 to 0.5 inch of water per foot of packing, although such is not required. If excessive pressure drop is encountered, the slipstream can be increased to remove more biomass. Additionally, biomass growth may be controllable, depending upon the pollutant and the biologically active material, by limiting the amount of nutrients provided.

Figure 2:
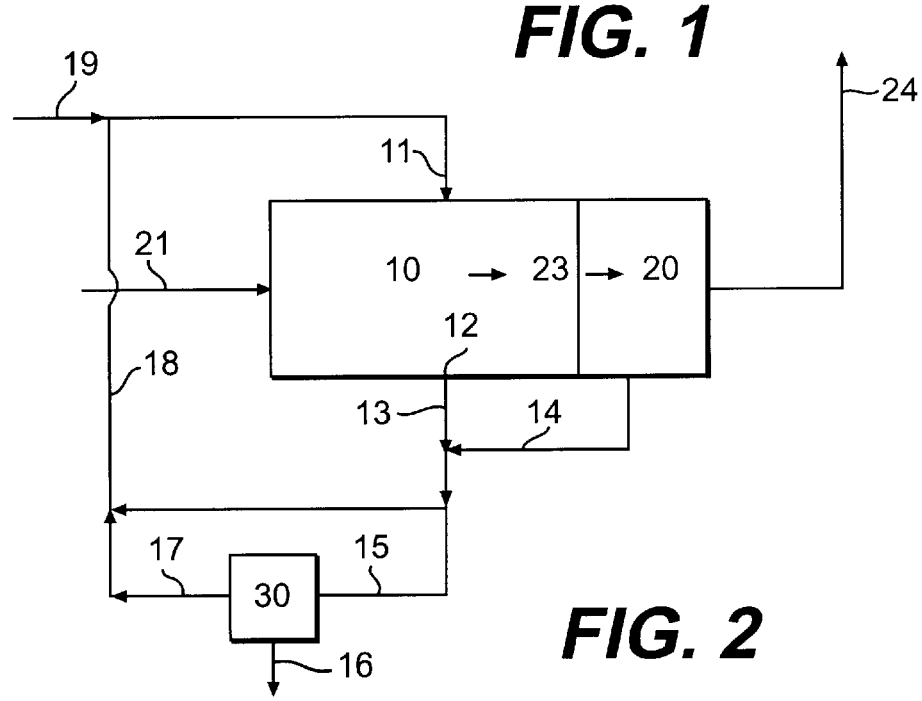
FIG. 2 is a schematic diagram of a bioscrubber apparatus according to the principles of the invention.

FIG. 2 shows an alternative approach where contact is made in cross-flow and the demister 20 is integral with the packed bed. This design is especially advantageous when limited headroom is available for installation. Further the slurry irrigation rates can be varied along the depth of the packed bed to optimize the kinetics of removal-biodegradation.

The invention having been thus described, the following examples are provided to further illustrate the present invention. However, these examples should not be considered as limiting of the scope of the invention.

EXAMPLE 1

A test is run in co-current mode with a filamentous packing that exhibits 85% free volume. Hydrobac S bacteria is used to coat activated carbon that has an average particle size of 30 microns, using a quantity of bacteria to provide a statistical population density of 1 bacterium per activated carbon particle. The bacteria is first removed from its bran support by placing the supported bacteria in heated water (90° F.) for about two hours with occasional stirring, followed by filtering with a paper towel to remove the bran. The water suspension of bacteria is then added to a water slurry containing 3.1% carbon by weight with initial shaking/stirring. The mixture is left alone for approximately 3 to 4 hours until the bacteria induced cloudiness is no longer visually observable. The resulting slurry is circulated over the filamentous packing. After leaving the column, the liquor is dropped into a vessel that is the supply source for the recirculating pump. Air containing from 120–160 PPMDV (DV=dry volume) of hydrogen sulfide is fed by a blower to the top of the bioscrubber-reactor flowing collinear to the liquor. When both the liquor and gas enter the liquor reservoir the surface area, about 10 times that of the scrubber, reduced the velocity of the gas sufficiently so that any entrained liquor was separated by gravity, and the gas left the system via an outlet port at the top of the recirculating liquor reservoir.

The gas streams, inlet and outlet, are sampled simultaneously at 15 minute intervals, and analyzed within a 5 minute period. The liquor is sampled at the beginning of each run and at about 10 minutes after equilibrium is achieved.

The test is run over a wide range of liquor and gas flow rates to establish, inter alia, the relationship of flows with efficiency of pollutant removal and product composition. Efficiency is calculated on the basis of the height of a transfer unit, a conventional method of chemical engineering design for mass transfer processes. Essentially, one transfer unit represents the height of packing in a scrubber through which the gas passes to achieve a 63% reduction in concentration from entry to exit. To achieve a 90% reduction, 2.3 transfer units are required. To achieve a 99% reduction, 4.6 transfer units are required. The transfer unit approach is more design oriented than efficiency because efficiency can be misleading in extrapolating data.

In all tests, equilibration of the removal rate occurs in 15 minutes or less, and the removal rate remains constant thereafter. The pH is essentially invariant at around 7. The removal performance is as follows:

| FLOW RATES LB/(HR)(FT) | | HEIGHT OF TRANSFER | HEIGHT TO ACHIEVE |
|---|---|---|---|
| GAS | LIQUID | UNIT-Ft | 99% REMOVAL-Ft |
| 536 | 11600 | 2.3 | 10.6 |
| 995 | 11600 | 3.5 | 16.1 |
| 1378 | 11600 | 4.6 | 21.2 |
| 536 | 6480 | 2.8 | 12.9 |
| 995 | 6480 | 4.0 | 18.4 |
| 1378 | 6480 | 5.8 | 26.7 |

EXAMPLE 2

A slurry of bacteria deposited on activated carbon is prepared in the same way as described in Example 1. The water slurry is prepared to contain 7.1 % activated carbon by weight with approximately one bacteria for each particle of carbon at start-up. The equipment and the arrangement are identical to that used in Example 1. The inlet gas is supplied as air containing toluene vapor at a concentration in the range of 60–80 PPMDV. The gas and liquid are monitored for toluene, and the liquor was also tested for concentration of carbon dioxide. Sampling and analysis were conducted with the same interval period as used in the tests of Example 1.

Equilibration is achieved in 15 minutes or less. The pH is invariant at 7.0. The removal performance is as follows:

| FLOW RATES LB/(HR)(FT) | | HEIGHT OF TRANSFER | HEIGHT TO ACHIEVE |
|---|---|---|---|
| GAS | LIQUID | UNIT-FEET | 99% REMOVAL-FEET |
| 536 | 6200 | 6.5 | 29.9 |
| 536 | 9800 | 5.4 | 24.8 |
| 536 | 14000 | 4.8 | 22.1 |
| 995 | 6200 | 8.6 | 39.6 |
| 995 | 9800 | 6.1 | 28.1 |
| 995 | 14000 | 5.5 | 25.3 |

The toluene dissolved in the recirculating liquor ranges in concentration between non-detectable and 2.5 micrograms per liter, which is about one millionth of the equilibrium solubility based on Raoult's Law. Carbon dioxide is found in accordance with the anticipated products of bacterial assimilation.

The invention having been thus described it will be obvious that the same may be varied in many ways without departing from the spirit and scope thereof. All such modifications are intended to be included within the scope of the invention which is defined by the following claims.

I claim:

1. A process for scrubbing a gas stream, which comprises: contacting a gas containing pollutant with a slurry containing a particulate absorbent carrying a biologically active material thereon, in a packed bed, wherein the gas is passed through said bed at a mass flow rate of at least about 500 lbs/(hr·ft$^2$) and the ratio of the slurry flow rate to the gas mass flow rate is greater than about 2:1, thereby reducing the amount of said pollutant by biodegradation.

2. The process according to claim 1, wherein said gas containing said pollutant and said slurry are introduced into said packed bed at a commom end thereof and proceed in co-current flow through said bed.

3. The process according to claim 1, wherein said gas containing said pollutant said slurry are introduced into said packed bed substantially perpendicular to one another and proceed in cross-flow through said bed.

4. The process according to claim 1, wherein said packed bed is made of a filamentous packing material.

5. The process according to claim 1, wherein said packed bed exhibits a free volume of at least 70%.

6. The process according to claim 1, wherein said pollutant is selected from the group consisting of hydrocarbons, oxygenated hydrocarbons, halogenated hydrocarbons, halogenated-oxygenated hydrocarbons, nitrogen compounds, and sulfur compounds.

7. The process according to claim 6, wherein said pollutant is selected from the group consisting of aliphatics, aromatics, alcohols, aldehydes, ketones, esters, and halogen-substituted derivatives thereof.

8. The process according to claim 6, wherein said pollutant is selected from the group consisting of nitrogen oxides, sulfur oxides, and sulfides.

9. The process according to claim 6, wherein said pollutant is hydrogen sulfide or dimethyl sulfide.

10. The process according to claim 1, wherein said particulate adsorbent has an average particle size in the range of from 5 to 150 microns.

11. The process according to claim 1, wherein said particulate adsorbent is selected from the group consisting of activated carbon, char, diatomaceous earth, alumina, aluminosilicates and flyash.

12. The process according to claim 1, wherein substantially all of said particulate adsorbent supports a biologically active material.

13. The process according to claim 1, wherein said biologically active material is a microorganism.

14. The process according to claim 13, wherein said microorganism is a bacteria.

15. The process according to claim 1, which further comprises after said contacting step, recirculating said slurry back to said packed bed and repeating said contacting step.

16. The process according to claim 1, wherein said biodegradation is substantially complete when said slurry exits said packed bed.

17. A process, which comprises:
   (1) passing through a filamentous packed bed having a free volume of at least 70%, (1) a gas stream containing a pollutant at a mass flow rate of from about 250 to about 2500 lbs/(hr·ft$^2$) and (2) a slurry containing a particulate adsorbent having a biologically active material thereon at a mass flow rate of from about 1,000 to 17,000 lbs/(hr·ft$^2$), wherein the ratio of the slurry mass flow rate to the gas mass flow rate is within the range of from 2:1 to 20:1 and the mean residence time in the packed bed is not more than 60 seconds; and
   (2) adsorbing at least 60% of said pollutant onto said particulate adsorbent and biodegrading said adsorbed pollutant by said biologically active material before said slurry exits the packed bed.

18. The process according to claim 17, wherein said particulate adsorbent is activated carbon and said biologically active material is a bacterium.

19. The process according to claim 17, wherein at least 50% of all of said particulate adsorbent supports a biologically active material.

20. The process according to claim 17, wherein said particulate adsorbent is activated carbon having an average particle size of from about 5 to 150 microns and is present in an aqueous medium in an amount of from about 0.5 to 15 wt. % and wherein substantially all of said particulate adsorbent supports a biologically active material.

* * * * *